(12) United States Patent
Shibata

(10) Patent No.: US 8,465,313 B2
(45) Date of Patent: *Jun. 18, 2013

(54) CONNECTOR AND CONNECTOR ASSEMBLY

(75) Inventor: Takahiro Shibata, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/104,120

(22) Filed: May 10, 2011

(65) Prior Publication Data

US 2011/0286787 A1 Nov. 24, 2011

(30) Foreign Application Priority Data

May 24, 2010 (JP) ................................. 2010-118650

(51) Int. Cl.
*H01R 13/52* (2006.01)
(52) U.S. Cl.
USPC ........................................................ 439/271
(58) Field of Classification Search
USPC ................. 439/271, 272, 278, 293, 587, 559, 439/89; 174/153 G
See application file for complete search history.

(56) References Cited

U.S. PATENT DOCUMENTS

| 5,389,005 | A | 2/1995 | Kodama |
| 5,458,508 | A | 10/1995 | Sawada |
| 5,622,512 | A | 4/1997 | Uchida et al. |
| 7,029,328 | B1 * | 4/2006 | Mckenzie et al. ............ 439/587 |
| 7,104,840 | B2 * | 9/2006 | Murakami .................... 439/587 |

FOREIGN PATENT DOCUMENTS

| DE | 20004565 U1 | 7/2000 |
| JP | 2006-147474 | 6/2006 |
| JP | 2006147474 | 6/2008 |

* cited by examiner

*Primary Examiner* — Renee S Luebke
*Assistant Examiner* — Harshad Patel
(74) *Attorney, Agent, or Firm* — Gerald E. Hespos; Michael J. Porco; Matthew T. Hespos

(57) ABSTRACT

Catches (37) project from a female housing (11) and end surfaces of a seal (12) define pressing surfaces (32). The pressing surfaces (32) are pressed to push the seal (12) to a mount position in the process of mounting the seal (12) into the female housing (11), and the seal (12) resiliently moves past the catching pieces (37) and engages with the catches (37) at the mount position. The pressing surfaces (32) of the seal (12) are arranged at positions overlapping the catches (37) in projecting directions of the catching pieces (37) when the seal (12) is mounted into the female housing (11).

13 Claims, 8 Drawing Sheets

CONNECTOR AND CONNECTOR ASSEMBLY

BACKGROUND OF THE INVENTION

1. Field of the Invention

The invention relates to a connector and to a connector assembly comprising it.

2. Description of the Related Art

A conventional connector is disclosed in Japanese Unexamined Patent Publication No. 2006-147474. This connector includes a housing with a terminal accommodating portion and an outer tubular portion, and an annular seal member to be mounted on the terminal accommodating portion. A mating housing is fitted between the terminal accommodating portion and the outer tubular portion, and the seal member is formed with a flange which projects radially outwardly and resiliently sandwiched between the two housings in a connected state. Further, the outer tubular portion is formed with a catching piece projecting inwardly.

An end surface of the flange serves as a pressing surface and, in the process of mounting the seal member into the housing, the pressing surface is pressed to push the seal member to a mount position. At the mount position, the flange resiliently moves past the catching portion and is engaged with the catching portion, whereby the seal member is mounted and retained in the housing.

In the above case, the pressing surface of the seal member is arranged at a position overlapping the catching portion in a width direction of the catching portion, i.e. arranged side by side with the catching portion in the projecting direction of the catching portion when the seal member is mounted into the housing.

In the case of the above conventional connector, it is difficult to ensure a sufficient space between the terminal accommodating portion and the outer tubular portion in the projecting direction of the catching portion. In addition, since the catching portion and the pressing surface are arranged side by side in this narrow space, a sufficient pressing area of the pressing surface cannot be ensured by being taken up by the catching portion. On the other hand, if the space between the terminal accommodating portion and the outer tubular portion is enlarged, it leads to enlargement of the housing, which is not preferable.

The invention was developed in view of the above situation and an object thereof is to improve operability of a connector and a connector assembly.

SUMMARY OF THE INVENTION

The present invention is directed to a connector, comprising a housing connectable to a mating housing; and a seal mounted in the housing to be held in close contact with the two housings in a connected state by being sandwiched between the two housings; wherein the housing is formed with at least one catching piece; an end surface of the seal serves as a pressing surface; the pressing surface is pressed to push the seal member to a mount position in the process of mounting the seal into the housing and the seal member resiliently moves past the catching piece and is engaged with the catching piece at the mount position; and the pressing surface of the seal member is arranged at a position at least partly overlapping the catching piece in a projecting direction of the catching piece when the seal is mounted into the housing.

Thus, a sufficient pressing area of a pressing surface of a seal is ensured without enlarging the housing, thereby improving operability of the connector. Moreover, since the pressing surface of the seal is arranged at the position overlapping the catching piece in the projecting direction of the catching piece when the seal member is mounted into the housing, the pressing surface can be formed in a sufficient space in the projecting direction of the catching piece. As a result, a sufficient pressing area of the pressing surface of the seal member can be ensured without enlarging the housing.

Two pressing surfaces of the seal preferably are arranged at the substantially opposite sides of the catching piece when the seal member is mounted into the housing. Thus, a jig used to press the pressing surfaces can have, for example, a channel or recessed shape to increase the strength of the jig.

The seal preferably has at least one projection projecting in substantially the same direction as the projecting direction of the catching piece from a part of the seal adjacent to the pressing surface; and the projection is engaged with the catching piece. Thus, an area of engagement of the seal with the catching piece can be adjusted according to a projecting amount of the projection.

The housing preferably includes a housing main body, an outer tube at least partly surrounding the housing main body while being spaced apart by a specified distance, and a coupling that couples the housing main body and the outer tube.

The coupling preferably is formed with at least one through hole at a position substantially corresponding to a flange of the seal, and a receiving portion projects backward from a position substantially corresponding to the through hole. The flange can be passed through the through hole to be inserted into the receiving portion, so that at least part of the flange can be seen from the outside.

The seal preferably has a color different from the housing.

The invention also relates to a connector assembly comprising the above-described connector and a mating connector connectable thereto.

The mating connector preferably comprises a mating housing connectable to the housing and having at least one recess in a connection surface substantially facing the housing in a connected state.

A nut preferably is inserted into the recess and is fixed to the mating housing in a state exposed on the connection surface. The nut is threadedly engaged with a bolt mounted in the housing to hold the two housings in the connected state.

A sealing material is to be introduced into the recess and the outer peripheral surface of the nut is coated with the sealing material.

The recess of the mating housing preferably includes a first surface arranged to substantially face the outer peripheral surface of the nut while forming an introduction space for the sealing material between itself and the outer peripheral surface of the nut. A second surface projects radially out from the opening edge of the first surface and a third surface is arranged from the outer end of the second surface to the connection surface in a direction crossing a projecting direction of the second surface.

The second surface may define a jig contact surface. A jig for detecting air leak in an introduced part of the sealing material can be held in contact with the jig contact surface at a detection position.

The third surface may define a jig guiding surface that can substantially guide the jig to the detection position.

The second surface and the third surface preferably are sealing surfaces that keep a space to the jig air-tight at the detection position.

The sealing material may leak out from the recess. However, the leaked sealing material may be trapped in a trap space defined by the second and third surfaces in the recess.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
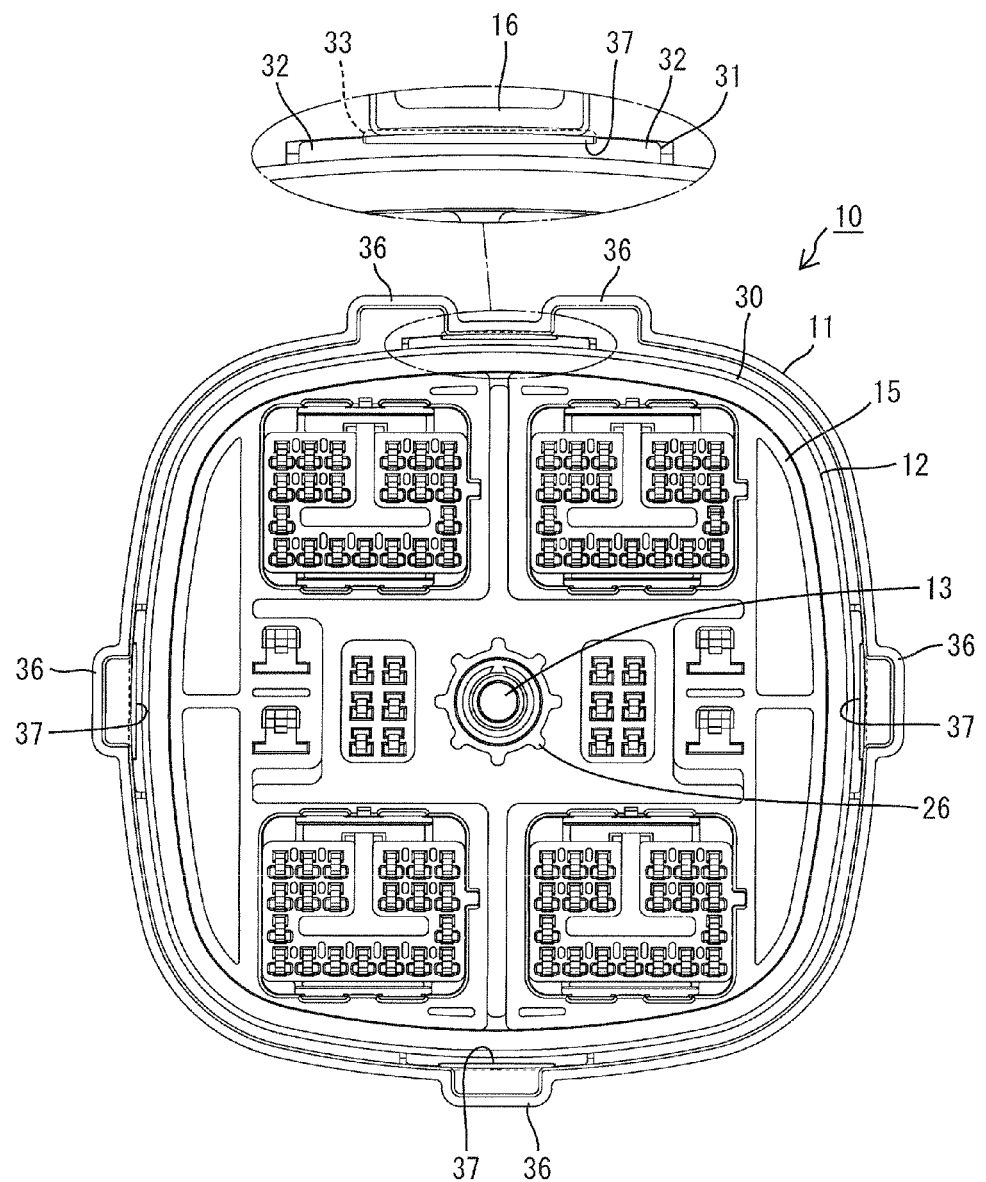
FIG. 1 is a front view of a female one of two connectors according to one embodiment of the invention.
Figure 2:
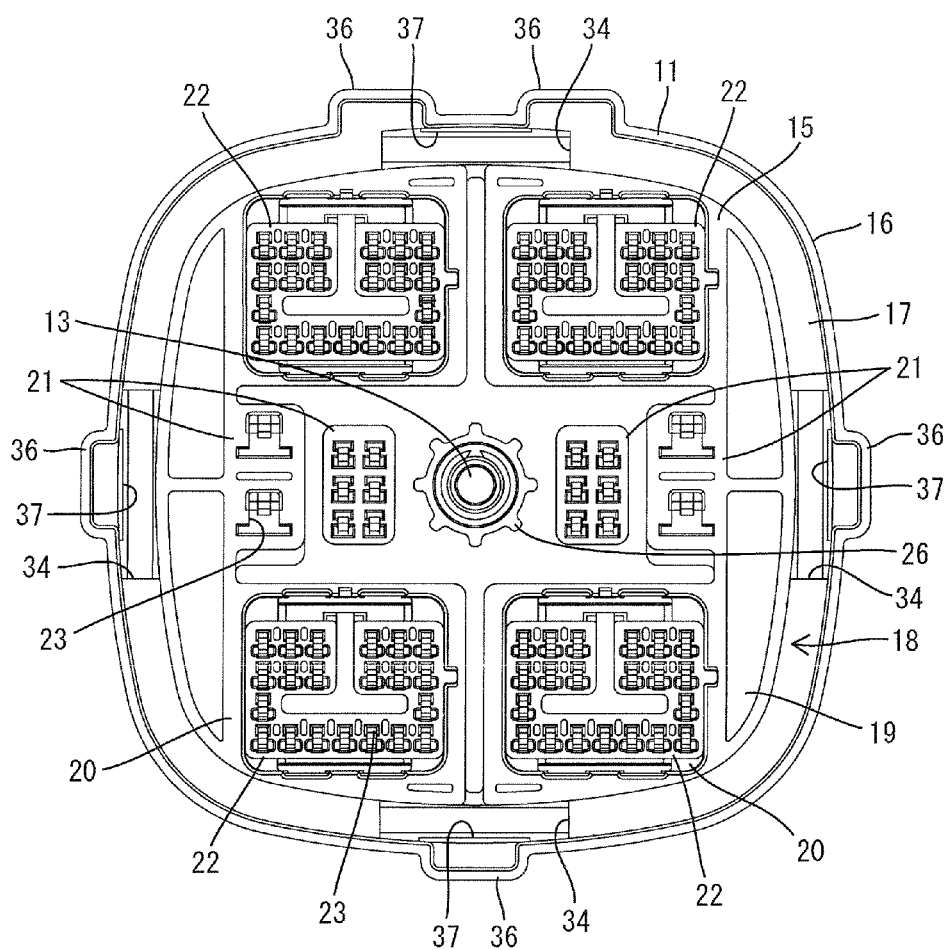
FIG. 2 is a front view of a female housing.

A connector assembly according to the invention includes female and male connectors 10, 50 connectable to each other. The female connector 10 includes a female housing 11, a seal 12, at least one bolt 13 and one or more female terminal fittings 14. The male connector 50 includes a male housing 51, at least one nut 52, a moving plate 53 and one or more male terminal fittings 54. In the following description, ends of the two connectors 10, 50 to be connected are referred to as front ends concerning forward and backward directions.

Figure 5:
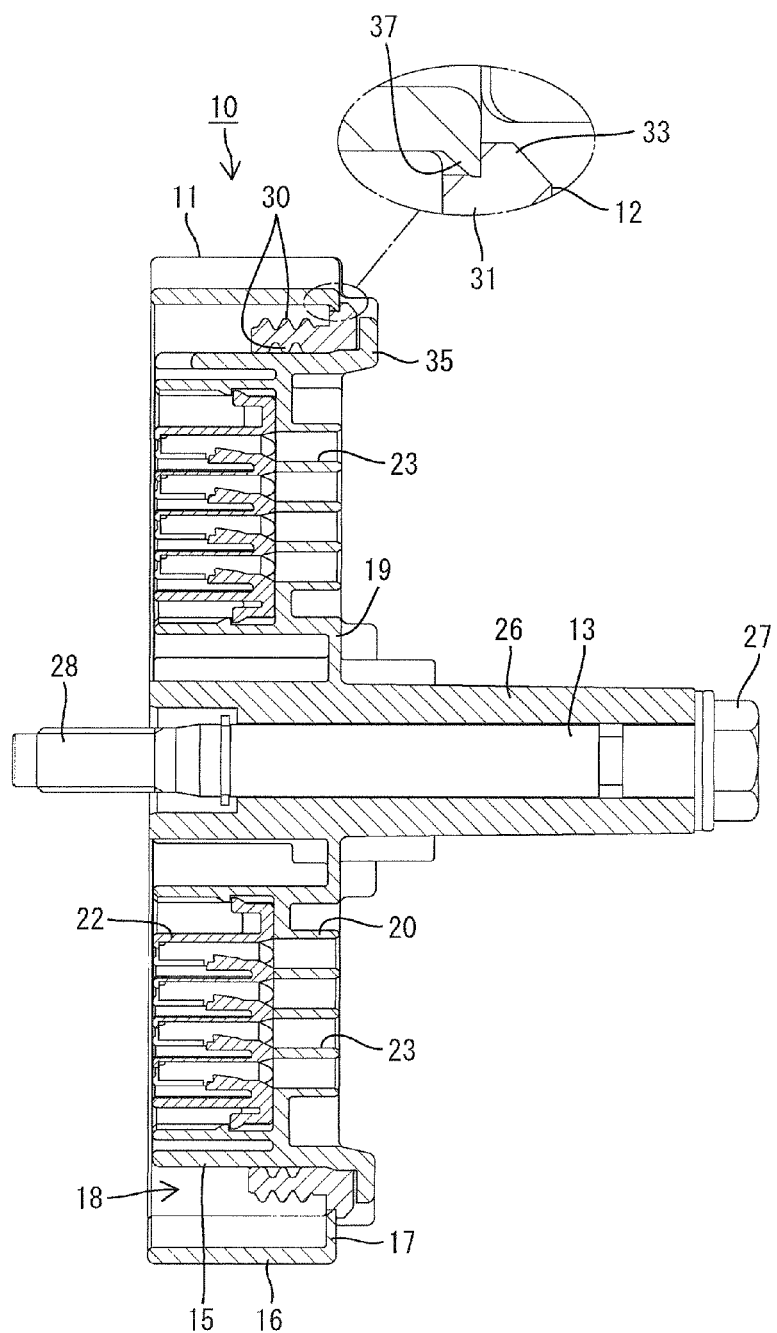
FIG. 5 is a section of the female connector.
Figure 6:
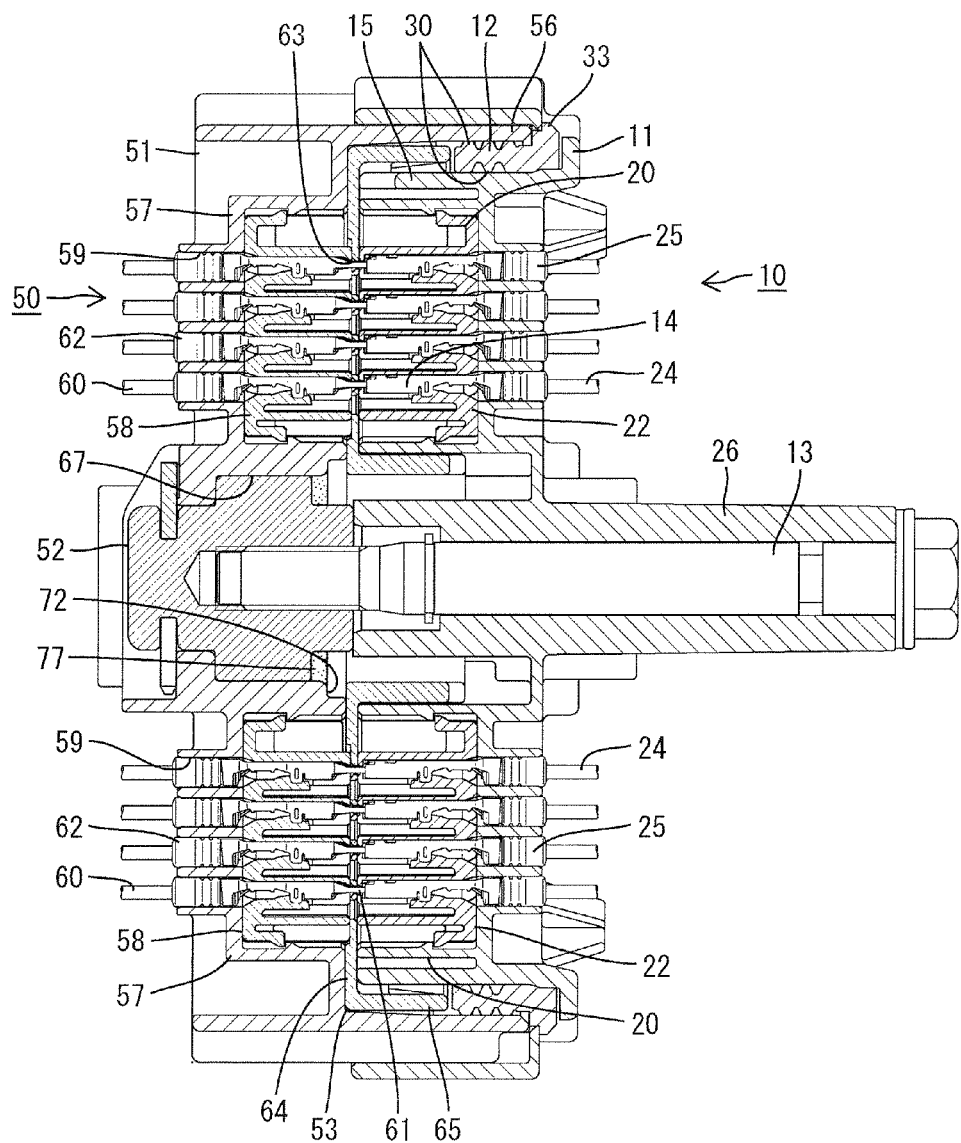
FIG. 6 is a section of the two connectors in a connected state.

The female housing 11 is made of synthetic resin and is substantially flat and short in forward and backward directions, as shown in FIGS. 5 and 6. The female housing 11 includes a housing main body 15 that is substantially rectangular in front view. An outer tube 16 at least partly surrounds the housing main body 15 while being spaced apart by a specified distance. A coupling 17 couples the rear ends of the housing main body 15 and the outer tube 16. A mounting space 18 is defined between the housing main body 15 and the outer tube 16 and can receive a receptacle 56 of the mating male housing 51.

The housing main body 15 includes a back plate 19 that extends substantially continuous from the coupling 17. Spaced apart female sub-housing accommodating portions 20 are formed in the back plate 19 and cavity towers 21 project forward from the back plate 19 between the respective female sub-housing accommodating portions 20. A corresponding female sub-housing 22 is fit in each female sub-housing accommodating portion 20. Female cavities 23 are formed in the cavity towers 21 and the female sub-housings 22, and the female terminal fittings 14 are retained in the respective female cavities 23. The female terminal fittings 14 are connected respectively to end portions of wires 24, and the connected wires 24 are drawn out backward from the rear surface of the housing main body 15 (see FIG. 6). A female rubber plug 25 is mounted on the outer peripheral surface of each wire 24 to closely contact this outer peripheral surface and the inner peripheral surface of the corresponding female cavity 23.

A bolt mounting portion 26 projects forward in a substantially central part of the back plate 19. The front ends of the bolt mounting portion 26, the cavity towers 21 and the female sub-housing accommodating portions 20 are aligned substantially at the same position, and a connection surface of the female housing 11 is formed by these front ends. The bolt mounting portion 26 includes a long and narrow cylindrical part projecting backward from the back plate 19. The bolt 13 is held rotatably in the bolt mounting portion 26. A head 27 of the bolt 13 is arranged to face the rear end opening of the bolt mounting portion 26, and a shaft 28 of the bolt 13 is arranged to project forward from the front end opening of the bolt mounting portion 26, i.e. from the connection surface.

Figure 3:
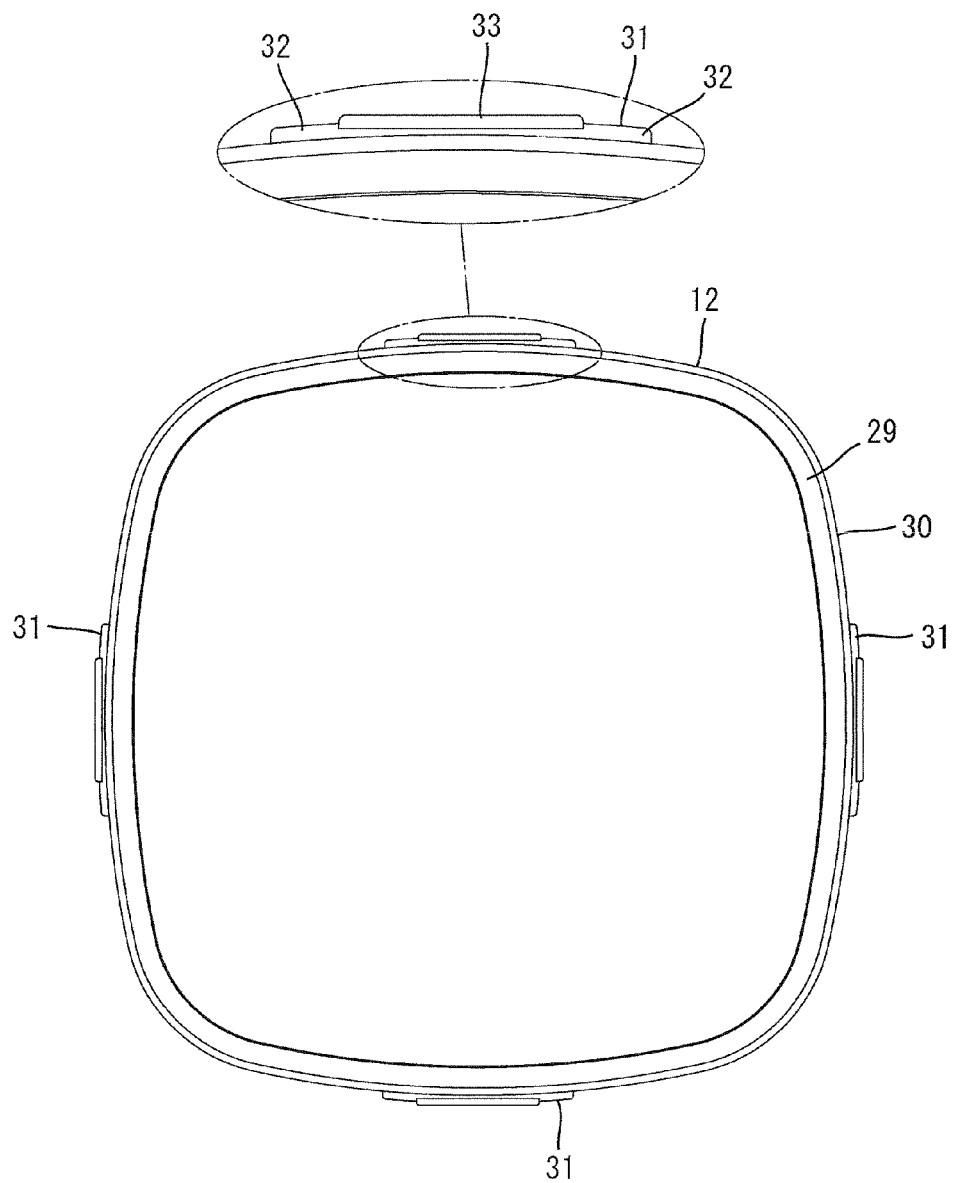
FIG. 3 is a front view of a seal member.

The seal 12 is made of a resilient material such as rubber and, as shown in FIG. 3, includes an annular seal main body 29 with four somewhat angular corners. The seal 12 is mounted into the female housing 11 so that the seal main body 29 is on the outer peripheral surface of the housing main body 15 and is inserted deeply into the mount space 18 to contact the coupling 17.

Lips 30 are formed on the inner and outer surfaces of the seal main body 29 and are spaced apart in forward and backward directions. The inner lips 30 are brought resiliently into close contact with the outer peripheral surface of the housing main body 15 and the outer lips 30 are brought resiliently into close contact with the inner peripheral surface of the mating receptacle 56 when the two housings 11, 51 are connected. As a result the space between the two housings 11, 51 is sealed in a fluid- or liquid-tight manner (see FIG. 6).

Flanges 31 that extend back from the seal main body 29 and then project out. The flanges 31 are long and narrow in a circumferential direction along the seal main body 29 and are arranged at substantially equal intervals in the circumferential direction. In this embodiment, four flanges 31 are arranged respectively at upper, lower, left and right positions spaced apart by 90°. The outer projecting ends of the respective flanges 31 are located farther out than the respective outer lips 30. The opposite ends of the front surface of each flange 31 in the circumferential direction define pressing surfaces 32 to be pressed by an unillustrated mounting jig when the seal 12 is mounted into the female housing 11.

A projection 33 projects radially at a position between the pressing surfaces 32 at the projecting end of each flange 31. This projection 33 is long and narrow along a central part of the projecting end of each flange 31 and is at a rear portion of the each flange 31.

The coupling 17 is formed with through holes 34 in the form of long narrow slits that extend in the circumferential direction at positions corresponding to the respective flanges 31, and receiving portions 35 project back from positions corresponding to the through holes 34. The receiving portions 35 are in the form of shallow boxes that are open outward. Rear parts of the respective flanges 31 are inserted into the receiving portions 35 and passed through the through holes 34. Thus, the rear parts of the respective flanges 31 including the projections 33 can be seen from the outside. Note that the seal 12 preferably has a color different from the housing main body 15 to ensure good visual discrimination between the seal 12 and the housing main body 15.

Circumferentially spaced bulges 36 project out on the outer tube 16 at positions substantially facing the respective flanges 31 of the seal main body 29 when the seal 12 is mounted into the female housing 11. Specifically, upper bulges 36 are arranged at positions substantially corresponding to the both pressing surfaces 32 of the upper flange 32, and lower, left and right bulges 36 are arranged at positions substantially corresponding to the lower, left and right projections 33.

Catches 37 project in at positions on the coupling 17 corresponding to the respective receiving portions 35 and partly close the through holes 34. The catches 37 engage the corresponding projections 33 when the seal 12 is mounted in the female housing 11 to prevent detachment of the seal 12 from the female housing 11. Each catch 37 has a circumferential length as long as the projections 33 or slightly shorter than the projections 33. Only the projections 33 of the seal 12 can be engaged with the catches 37. The upper catch 37 is arranged between the upper bulges 36 and the lower, left and right catches 37 are arranged in correspondence with the lower, left and right bulges 36.

Each catch 37 overlaps the pressing surfaces 32 of the corresponding flange 31 of the seal 12 in a radial projecting direction of the projection 33 when the seal 12 is mounted into the female housing 11. More specifically, both pressing surfaces 32 are arranged at the opposite sides of the catch 37 in the circumferential direction (see FIG. 1).

Figure 7:
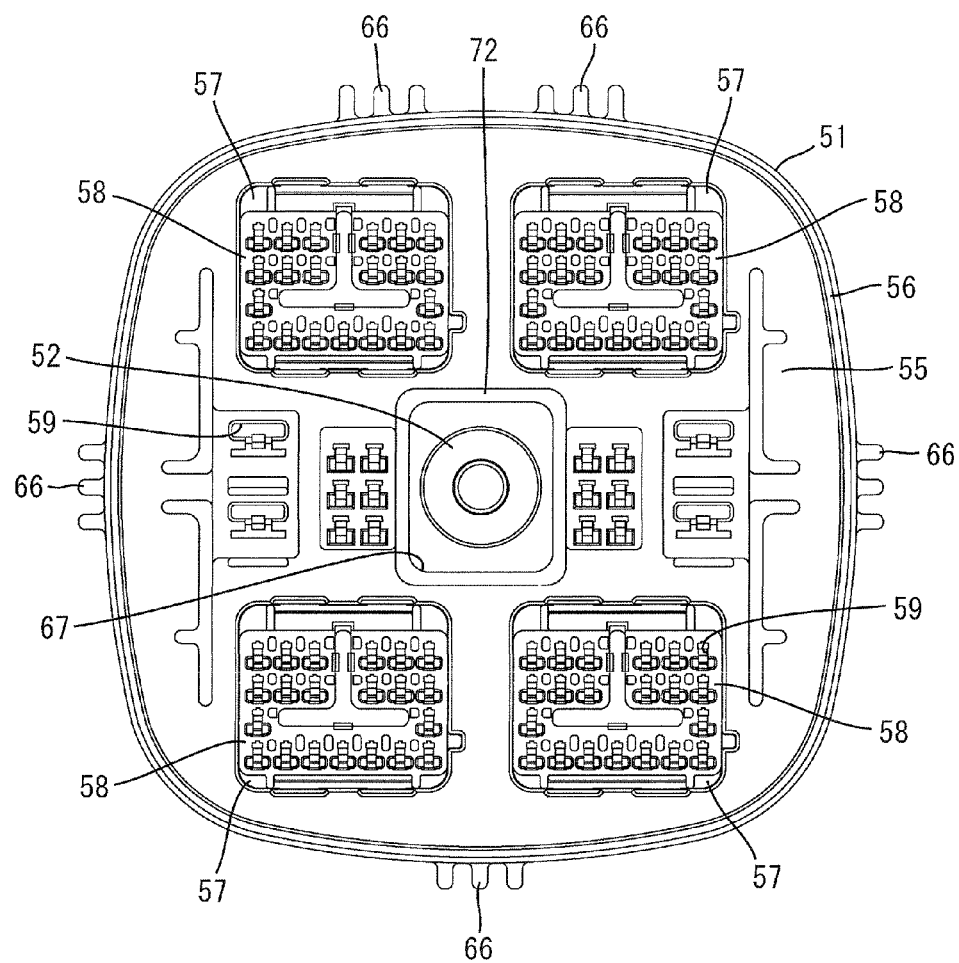
FIG. 7 is a front view of a male housing.

The male housing 51 is made e.g. of synthetic resin and, as shown in FIGS. 6 and 7, includes a terminal mounting portion 55 that is substantially flat and short in forward and backward directions and substantially rectangular in front view. A tube 56 projects forward from the peripheral edge of the terminal mounting portion 55. Circumferentially space male sub-housing accommodating portions 57 are formed in the terminal mounting portion 55 and corresponding male sub-housings 58 can be fit in the corresponding male sub-housing accommodating portions 57. The male sub-housings 58 are formed with male cavities 59, and the male terminal fittings 54 are held in the respective male cavities 59. The male terminal fittings 54 are connected to ends of wires 60 and the wires 60 are drawn out backward from the rear surface of the terminal mounting portion 55. Each male terminal fitting 54 includes a male tab 61 that projects into the receptacle 56. A male rubber plug 62 is mounted on the outer peripheral surface of each wire 60 to be held in close contact with the outer peripheral surface and the inner peripheral surface of the corresponding male cavity 59.

The moving plate 53 is to be inserted in the receptacle 56 and has a plate main body 64 formed with positioning holes 63 through which the respective male tabs 61 are inserted while being positioned. A peripheral wall 65 projects forward from the outer peripheral edge of the plate main body 64 and can slide in contact with the inner peripheral surface of the receptacle 56. The moving plate 53 is movable forward and backward between a standby position and a connection position in the receptacle 56. The male tabs 61 project only a small amount from the positioning holes 63 when the moving plate 53 is at the standby position. In the process of connecting the two housings 11, 51. The moving plate 53 is pushed by the mating female housing 11 to move from the standby position to the connection position. At the connection position, the male tabs 61 project more forward from the positioning holes 63 and are connected electrically conductively to the mating female terminal fittings 14. Further, the plate main body 64 is sandwiched between the front connection surfaces of the two housings 11, 51.

Circumferentially spaced ribs 66 project from the outer peripheral surface of the receptacle 56. The ribs 66 are inserted respectively into the bulges 36 of the mating female housing 11 when the two housings 11, 51 are connected properly, but interfere with the front edge of the outer tube 16 without being inserted into the bulges 36 when an attempt to connect the two housings 11, 51 is made with one housing inverted with respect to the other, thereby preventing an erroneous connection of the two housings 11, 51.

Figure 8:
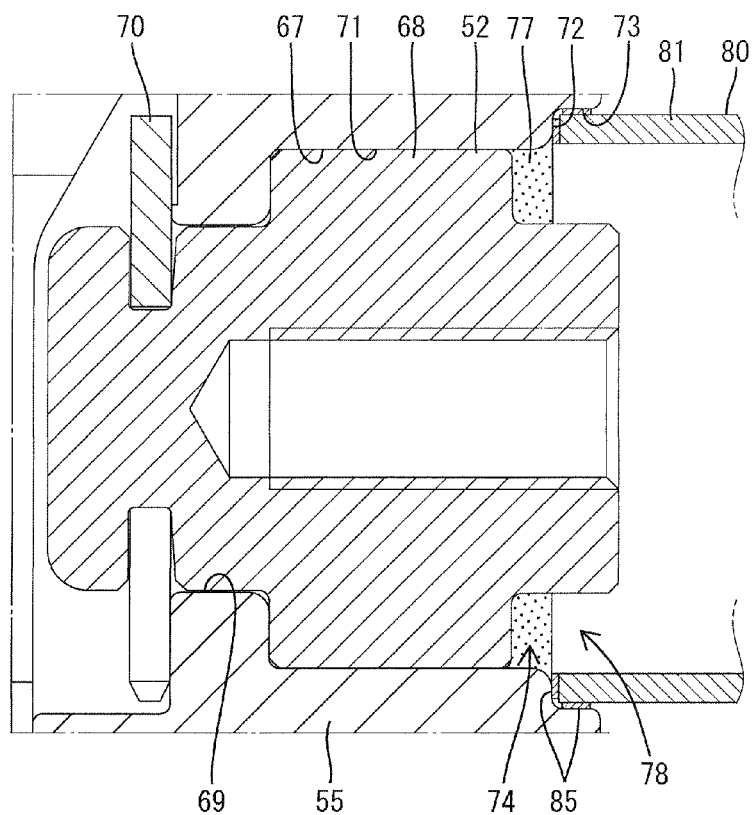
FIG. 8 is an enlarged section showing an essential part of the male housing.

A substantially rectangular recess 67 is formed in a central part of the front surface of the terminal mounting portion 55 and the nut 52 is fit in the recess 67. As shown in FIG. 8, the nut 52 has a cross-sectionally large portion 68 at a longitudinally intermediate position connected to front and rear parts of the nut 52 by steps. An insertion hole 69 is formed in a central part of the bottom surface of the recess 67 and penetrates from the bottom surface of the recess 67 to the rear surface of the terminal mounting portion 55. The cross-sectionally large portion 68 of the nut 52 is dimensioned to fit closely in an inner bottom part of the recess 67. Further, a rear end portion of the nut 52 projects from the insertion hole 69 and is fixed by a stopper 70 at the rear side of the terminal mounting portion 55.

The recess 67 is stepped to widen at an opening side. Specifically, the inner peripheral surface of the recess 67 has a first surface 71 that extends in forward and backward directions and closely contacts the cross-sectionally large portion 68 of the nut 52 and is arranged at a substantially constant distance from a front end portion of the nut 52. A second surface 72 is connected at a substantially at a right angle to the front end of the first surface 71 and extends out in a substantially radially direction away from the nut 52. A third surface 73 is connected at a substantially right angle to the outer end of the second surface 72 and extends from the outer end of the second surface 72 to the front connection surface of the terminal mounting portion 55 in forward and backward directions at a substantially right angle to the extending direction of the second surface 72. The second surface 72 is near the front surface of the terminal mounting portion 55 (opening edge of the recess 67).

A sealing material made of a potting material such as silicon resin is introduced into the recess 67 from the opening in the front surface. In this case, a space between the outer peripheral surface of the front end portion of the nut 52 and the first surface 71 of the recess 67 defines an introduction space 74 for the sealing material. The sealing material introduced into the introduction space 74 is coated or spread on the outer peripheral surface of the front end portion of the nut 52 and the first surface 71 of the recess 67. Thus, the nut 52 is sealed around in an air- or fluid-tight manner. The sealing material introduced into the introduction space 74 is cured, such as by being cooled, thereby forming a resin portion 77 in the recess 67.

The sealing material is introduced into the introduction space 74 of the recess 67. At this time, the sealing material is introduced using the position of the second surface 72 as an index so that the surface position thereof is substantially aligned with the second surface 72 in forward and backward directions. Any sealing material that leaks out from the introduction space 74 of the recess 67 is trapped in at least one trap space 78 defined by the second and third surfaces 72, 73 in the recess 67. Thus, the leaked sealing material will not reach the front surface of the terminal mounting portion 55.

An air leak test is carried out after the sealing material is cured to determine whether a sealed state in the recess 67 is proper. A jig 80 including a substantially cylindrical detector 81 is used for air leak test, and a leading end portion of the detector 81 is inserted into the recess 67. In an insertion process of the jig 80, the outer peripheral surface of the leading end portion of the detector 81 slides in contact with the third surface 73 of the recess 67 while being positioned. At a detection position where an inserting operation of the detector 80 is ended, an opening end surface of the detector 81 contacts the second surface 72 to prevent any further insertion of the jig 80. In other words, the second surface 72 of the recess 67 defines a jig contact surface with which the jig 80 can be held in contact at the detection position, and the third surface 73 of the recess 67 defines a jig guiding surface that can guide the jig 80 to the detection position. The jig 80 blows out air to the surface of the resin portion 77 from the detector 81 at the detection position and checks the sealed state based on the presence or absence of air leakage.

Seal materials 85 are attached to the outer peripheral surface of the leading end portion of the detector 81 and the opening end surface of the detector 81. The seal materials 85 are held in close contact with the second surface 72 and the third surface 73 at the detection position, thereby preventing air leakage between the second surface 72 and the third surface 73. In other words, the second surface 72 and the third surface 73 of the recess 67 also function as sealing surfaces for holding a space to the jig 80 air-tight at the detection position.

Figure 4:
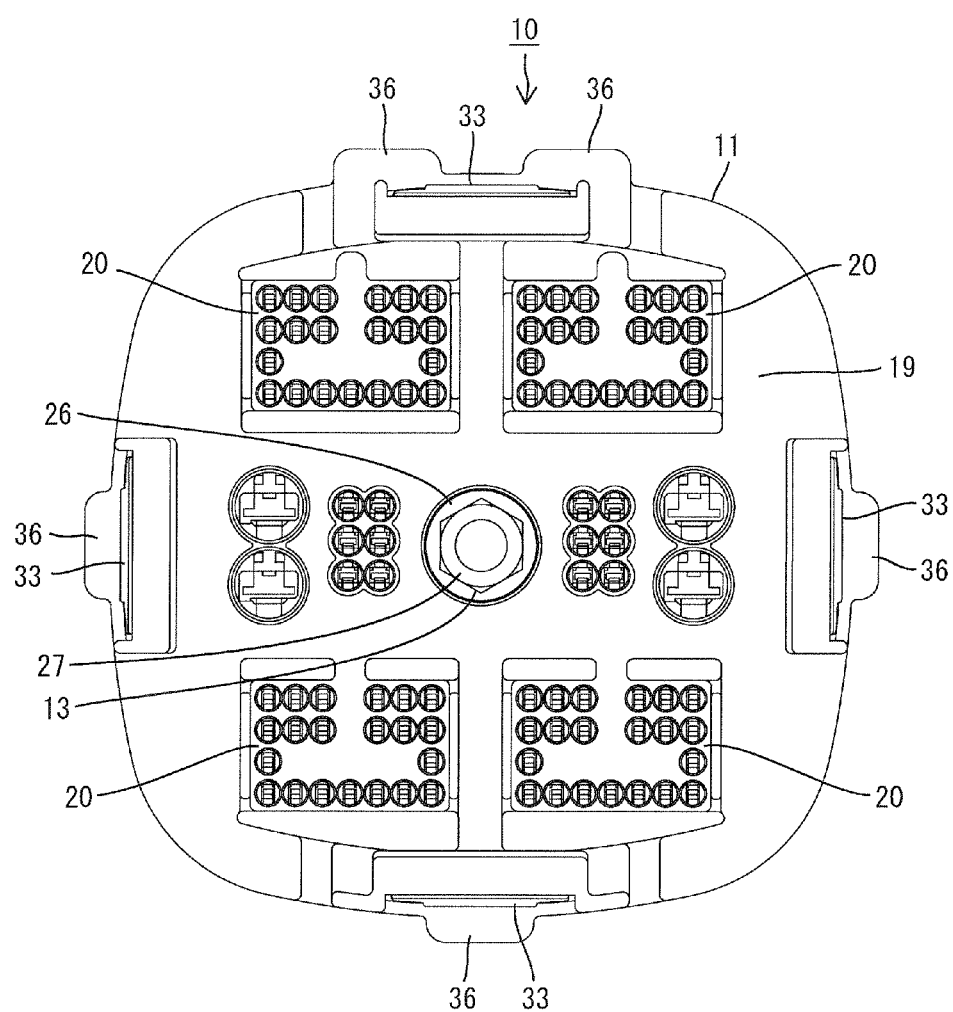
FIG. 4 is a rear view of the female housing.

On the other hand, the seal 12 is mounted on or to the housing main body 15 of the female housing 11. Upon mounting the seal 12 on the housing main body 15, a leading end portion of an unillustrated mounting jig is pressed against the pressing surfaces 32 of each flange 31 of the seal 12. The leading end portion of the mounting jig is substantially channel-shaped and includes two legs substantially facing the pressing surfaces 32. In this case, the leading ends of the legs press the pressing surfaces 32 while straddling the projection 33. Thus, the seal 12 is pushed toward the back side of the mount space 18. In the process of mounting the seal 12, the projections 33 interfere with the respective catching pieces 37 and resiliently deform the catching pieces 37 inwardly. As the seal 12 reaches a proper mount position, the projections 33 move past the catches 37 and restore resiliently. As a result, the projections 33 face the catches 37 from behind (see FIGS. 1 and 4). The seal 12 having reached the mount position in this way is prevented from coming out forward by the contact of the projections 33 with the catches 37 and are prevented from coming out backward by the contact of the seal 12 with the coupling 17.

Subsequently, upon starting a connecting operation of the two housings 11, 51, the two housings 11, 51 are arranged right opposite to each other and, in this state, the leading end of the shaft 28 of the bolt 13 is loosely screwed into the nut 52. The shaft 28 of the bolt 13 is screwed completely into the nut 52 and the two housings 11, 51 are connected to each other by this screwing operation. At this time, the head 27 of the bolt 13 is located behind and distant from the rear surface of the housing main body 15 by the bolt mounting portion 26. Thus, the wires 24 drawn out from the rear surface of the housing main body 15 are not tangled in a jig for tightening the bolt 13.

The surface position of the sealing material introduced into the recess 67 is based on the second surface 72. Thus, any sealing material that leaks out from the first surface 71 to the second surface 72 of the recess 67 is trapped by the third surface 73 of the recess 67 and will not reach the connection surface of the housing main body 15. Thus, it is not necessary to strictly manage the introduced amount of the sealing material and operability at the time of introducing the sealing material is improved.

The second surface 72 of the recess 67 is the jig contact surface with which the jig 80 for air leak test can be held in contact at the detection position. Thus, the construction can be simplified as compared with the case where a special jig contact surface is formed separately from the second surface 72.

The third surface 73 of the recess 67 serves as the jig guiding surface and guides the jig 80 to the detection position. Thus, the construction can be simplified as compared with the case where a jig guiding surface is formed separately from the third surface 73.

The second and third surfaces 72 and 73 of the recess 67 serve as the sealing surfaces to keep the space to the jig 80 fluid- or air-tight at the detection position. Thus, the construction can be simplified as compared with the case where special sealing surfaces are formed separately from the second surface 72 and the third surface 73.

The pressing surfaces 32 of the seal 12 are arranged at positions overlapping the respective catches 37 in the projecting directions of the catches 37 when the seal 12 is mounted into the female housing 11. Thus, the pressing surfaces 32 can be formed in sufficient spaces in the projecting directions of the catches 37. As a result, sufficient pressing areas of the pressing surfaces 32 of the seal 12 can be ensured without enlarging the female housing 11.

Two pressing surfaces 32 of the seal 12 are arranged at opposite sides of the catch 37 when the seal 12 is mounted into the female housing 11. Thus, the mounting jig for pressing the pressing surfaces 32 can have a channel shape to strengthen the jig.

The seal 12 has the projections 33 projecting in the same directions as the projecting directions of the catches 37 from parts adjacent to the pressing surfaces 32 and the projections 33 engage the catches 37. Thus, areas of engagement of the seal 12 with the catches 37 can be adjusted according to the projecting amounts of the projections 33.

The invention is not limited to the above described embodiment. For example, the following embodiments also are included in the scope of the present invention.

The catching pieces may be arranged in pairs and each pressing surface of the seal member may be positioned between the corresponding pair of catching pieces.

The second surface of the recess may not necessarily be orthogonal to the first and third surfaces.

Conversely to the above, a nut may be mounted in the female connector and a bolt may be mounted in the male connector.

What is claimed is:
1. A connector comprising:
a housing configured for connection to a mating housing along a connection direction and formed with a housing main body, an outer tube at least partly surrounding the housing main body while being spaced apart from the housing main body by a specified distance, and a coupling that couples the housing main body and the outer tube, at least one catch projecting from the outer tube toward the housing main body; and
a seal mounted in the housing between the housing main body and the outer tube and being configured for being sandwiched between the housing and the mating housing and closely contacting the housing and the mating housing in a connected state of the housing and the mating housing, a surfaces defined at one end of the seal and at opposite sides of the catch in directions transverse to the connecting direction, the pressing surfaces being pressed to push the seal to a mount position when mounting the seal into the housing and at least one projection projecting substantially in the projecting direction of the catch from a part of the seal substantially adjacent to and between the pressing surfaces, the projection of the seal moving resiliently beyond the catch and being engaged with the catch at the mount position.

2. The connector of claim 1, wherein the coupling is formed with at least one through hole at a position substantially corresponding to a flange of the seal, and a receiving portion projecting back from a position substantially corresponding to the through hole, the flange portion being passed through the through hole and inserted into the receiving portion, so that at least part of the flange can be seen from outside the connector.

3. The connector of claim 1, wherein the seal has a color different from the housing.

4. A connector assembly comprising the connector of claim 1 and a mating connector connectable thereto.

5. The connector assembly of claim 4, wherein the mating connector comprises a mating housing connectable to the housing and having at least one recess formed in a connection surface at least partly facing the housing in a connected state.

6. A connector assembly, comprising:
a connector having a housing formed with at least one catch;
a mating housing configured for connection to the housing, the mating housing having at least one recess formed in a connection surface at least partly facing the housing in a connected state;
a seal mounted in the housing and being configured for being sandwiched between and closely contacting the housing and the mating housing in a connected state the housing and the mating housing, a pressing surface defined at one end of the seal, the pressing surface being pressed to push the seal to a mount position when mounting the seal into the housing and the seal moving resiliently past the catch and engaged the catch at the mount position, the pressing surface of the seal being arranged at a position at least partly overlapping the catch in a projecting direction of the catch when the seal is mounted into the housing, wherein a nut is inserted into the recess in the mating housing and is fixed to the mating housing in a state exposed on the connection surface, the nut threadedly engaged with a bolt mounted in the housing to hold the two housings in the connected state.

7. The connector assembly of claim 6, wherein a sealing material is to be introduced into the recess and an outer peripheral surface of the nut is coated with the sealing material.

8. The connector assembly of claim 6, wherein the recess of the mating housing includes:
a first surface substantially facing the outer peripheral surface of the nut while forming an introduction space for the sealing material between itself and the outer peripheral surface of the nut,
a second surface projecting radially out from an opening edge of the first surface and
a third surface arranged from an outer end of the second surface to the connection surface in a direction crossing a projecting direction of the second surface.

9. The connector assembly of claim 8, wherein the second surface defines a jig contact surface with which a jig for detecting air leak in an introduced part of the sealing material can be held in contact at a detection position.

10. The connector assembly of claim 9, wherein the third surface defines a jig guiding surface that can substantially guide the jig to the detection position.

11. The connector assembly of claim 8, wherein the second and third surfaces are sealing surfaces that keep a space to the jig air-tight at the detection position.

12. The connector assembly of claim 11, further comprising at least one trap space defined by the second and third surfaces in the recess for trapping any sealing material that leaks out from the recess.

13. A connector, comprising:
a housing having a housing main body with opposite front and rear ends, an outer tube with opposite front and rear ends, the outer tube at least partly surrounding the housing main body while being spaced apart from the housing main body by a specified distance, and a coupling that couples the rear end of the housing main body and the rear end of the outer tube, at least one catch projecting from the rear end of the outer tube toward the housing main body; and
a seal mounted in the housing between the housing main body and the outer tube, pressing surfaces defined at one end of the seal and at opposite sides of the catch in directions transverse to a front to rear direction, the pressing surfaces being pressed to push the seal to a mount position when mounting the seal into the housing and at least one projection projecting substantially in a projecting direction of the catch from a part of the seal substantially adjacent to and between the pressing surfaces, the projection of the seal moving resiliently rearward the catch and being engaged with the catch at the mount position.

* * * * *